(12) United States Patent
Claessen et al.

(10) Patent No.: US 10,610,734 B2
(45) Date of Patent: Apr. 7, 2020

(54) CONFIGURABLE FLEXIBLE GOLF PUTTING GREEN SYSTEM AND METHODS

(71) Applicants: Albertus Maria Claessen, Oakwood, GA (US); Jan Lucas Kuiper, Gainesville, GA (US)

(72) Inventors: Albertus Maria Claessen, Oakwood, GA (US); Jan Lucas Kuiper, Gainesville, GA (US)

( * ) Notice: Subject to any disclaimer, the term of this patent is extended or adjusted under 35 U.S.C. 154(b) by 0 days.

(21) Appl. No.: 16/209,877

(22) Filed: Dec. 4, 2018

(65) Prior Publication Data

US 2019/0105536 A1 Apr. 11, 2019

Related U.S. Application Data

(63) Continuation-in-part of application No. 15/828,255, filed on Nov. 30, 2017, now Pat. No. 10,357,686, which is a continuation of application No. 15/462,628, filed on Mar. 17, 2017, now Pat. No. 9,861,854.

(60) Provisional application No. 62/599,689, filed on Dec. 16, 2017, provisional application No. 62/315,813, filed on Mar. 31, 2016.

(51) Int. Cl.
| | |
|---|---|
| A63B 24/00 | (2006.01) |
| A63B 71/06 | (2006.01) |
| A63B 67/02 | (2006.01) |
| A63B 43/00 | (2006.01) |
| A63B 47/00 | (2006.01) |
| A63B 69/36 | (2006.01) |

(52) U.S. Cl.
CPC ........ *A63B 24/0021* (2013.01); *A63B 43/004* (2013.01); *A63B 67/02* (2013.01); *A63B 71/0622* (2013.01); *A63B 47/002* (2013.01); *A63B 69/3697* (2013.01); *A63B 2024/0031* (2013.01); *A63B 2024/0034* (2013.01); *A63B 2071/0638* (2013.01); *A63B 2220/10* (2013.01); *A63B 2220/12* (2013.01); *A63B 2220/62* (2013.01); *A63B 2225/54* (2013.01)

(58) Field of Classification Search
None
See application file for complete search history.

(56) References Cited

U.S. PATENT DOCUMENTS

| | | |
|---|---|---|
| 3,633,917 A | 1/1972 | Anderson |
| 5,423,549 A | 6/1995 | Englmeier |
| 5,910,057 A | 6/1999 | Quimby et al. |
| 6,106,409 A | 8/2000 | Jackson |

(Continued)

*Primary Examiner* — Ronald Laneau
(74) *Attorney, Agent, or Firm* — Theodore Heske, III

(57) ABSTRACT

A configurable flexible putting green system and methods provide a golf putting experience on a highly configurable simulated putting green surface. A movable, flexible turf belt is tensioned between storage devices at each end of the turf belt. A portion of the turf belt is configured as a putt spot, supporting the player's weight and simulating a real putting experience. The system is provided with actuators underneath the turf belt for creating a variety of undulations, inclinations, and declinations so as to simulate a wide variety of golf putting scenarios. A golf computer is provided for controlling the turf belt and undulators to simulate golf putting conditions according to a database of simulated golf putting terrain matching existing golf courses.

20 Claims, 18 Drawing Sheets

(56) References Cited

U.S. PATENT DOCUMENTS

| | | | |
|---|---|---|---|
| 6,113,504 A | 9/2000 | Kuesters | |
| 6,634,959 B2 | 10/2003 | Kuesters | |
| 6,663,498 B2 | 12/2003 | Stipan | |
| 6,705,942 B1 | 3/2004 | Crook | |
| 6,916,250 B1 * | 7/2005 | Ricigliano | A63B 67/02 473/157 |
| 7,891,666 B2 | 2/2011 | Kuenzler | |
| 8,002,645 B2 | 8/2011 | Savarese | |
| 9,339,697 B2 | 5/2016 | Luciano et al. | |
| 9,616,328 B2 * | 4/2017 | Song | G06Q 30/00 |
| 9,861,854 B2 | 1/2018 | Kuiper | |
| 9,999,826 B2 * | 6/2018 | Ro | G09B 19/0038 |
| 2004/0014536 A1 | 1/2004 | Kuesters | |
| 2005/0085316 A1 | 4/2005 | Barr | |
| 2005/0227792 A1 | 10/2005 | McCreary et al. | |
| 2007/0049396 A1 | 3/2007 | Scheibe | |
| 2011/0074665 A1 | 3/2011 | Konishi | |
| 2011/0213474 A1 | 9/2011 | Jung | |
| 2012/0184340 A1 | 7/2012 | Jang | |
| 2012/0289351 A1 * | 11/2012 | Woo | A63B 24/0003 473/156 |
| 2013/0316839 A1 * | 11/2013 | Woo | A63B 67/02 473/156 |
| 2014/0004969 A1 * | 1/2014 | Jang | G09B 19/0038 473/156 |

* cited by examiner

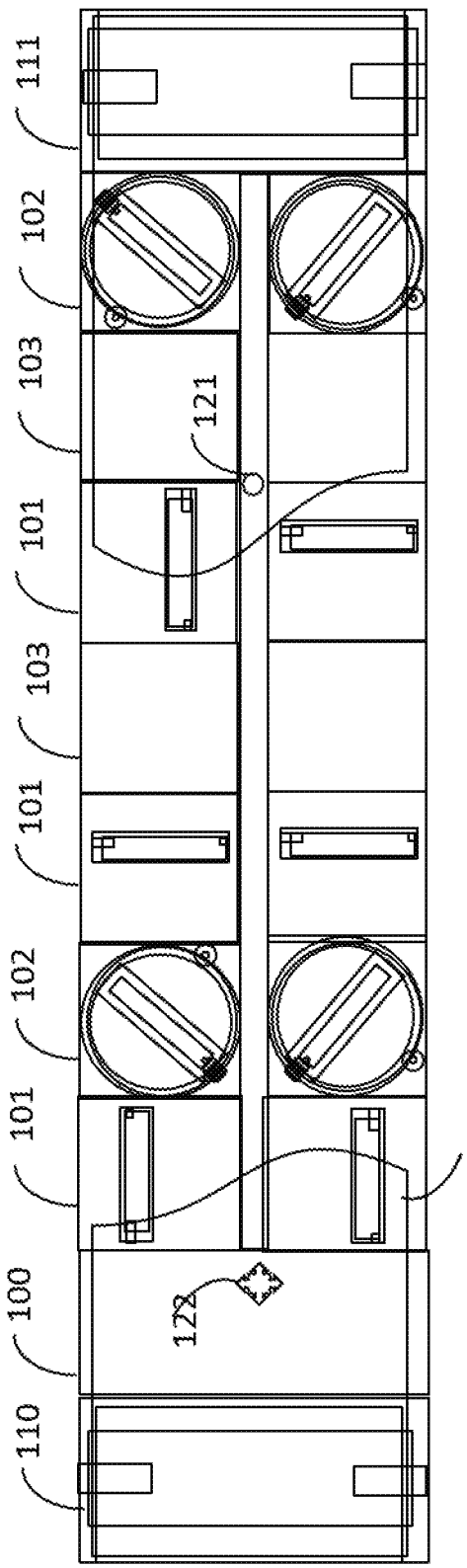
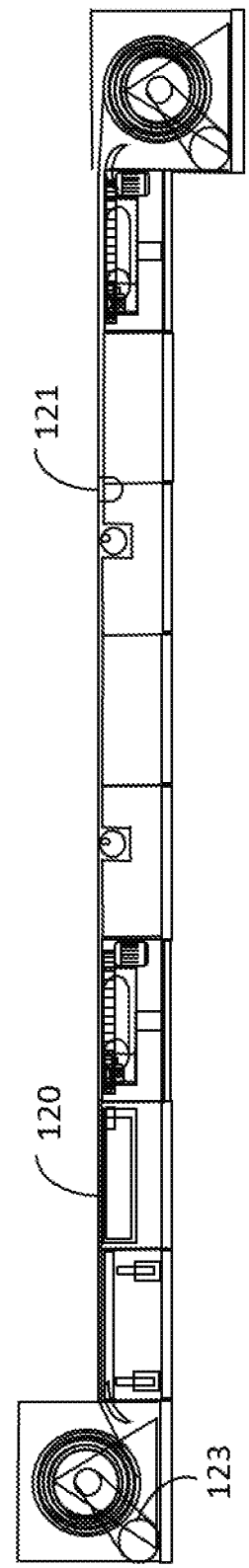
FIG. 1
FIG. 2

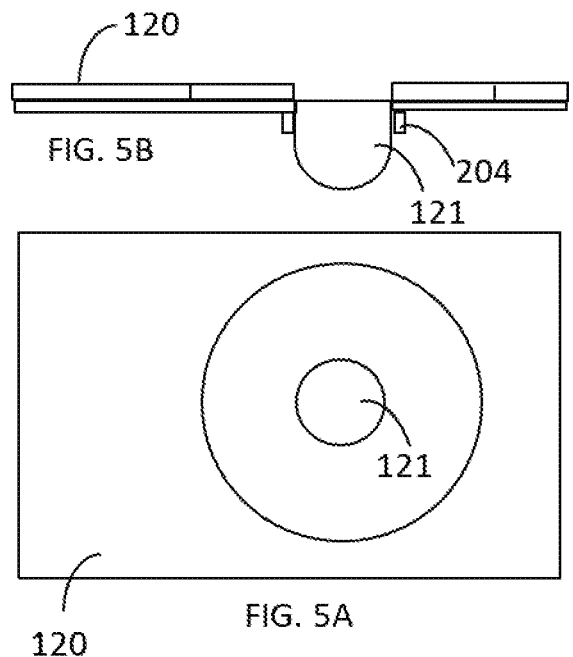
FIG. 5B
FIG. 5A
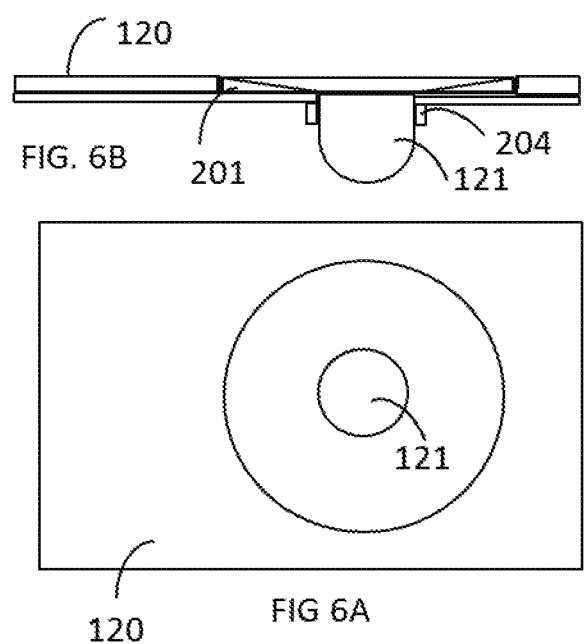
FIG. 6B
FIG 6A
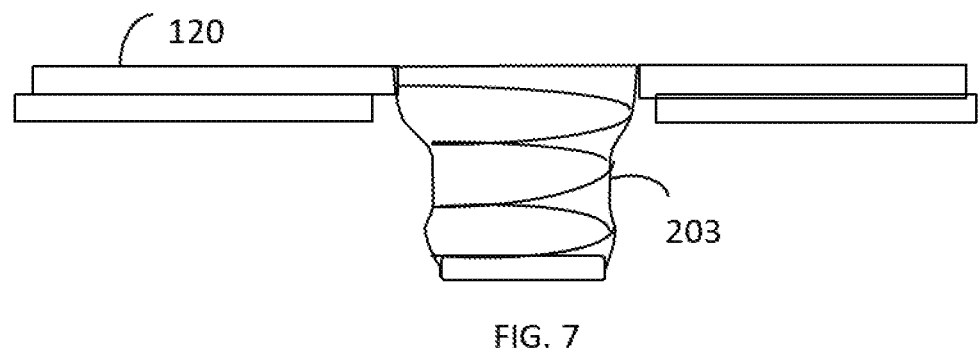
FIG. 7

Uphill putt

Downhill putt

CONFIGURABLE FLEXIBLE GOLF PUTTING GREEN SYSTEM AND METHODS

CROSS REFERENCE TO RELATED APPLICATIONS

This non-provisional utility application claims the benefit of prior filed U.S. provisional application No. 62/599,689, filed Dec. 16, 2017, entitled "Configurable Flexible Putting Green and Methods". U.S. Application No. 62/599,689, is incorporated herein by reference. The present application is also a continuation-in-part of and claims the benefit of application Ser. No. 15/828,255, filed Nov. 30, 2017 and entitled "Virtual Golf System and Methods". application Ser. No. 15/828,255, is a continuation of non-provisional utility application Ser. No. 15/462,628, filed Mar. 17, 2017, entitled "Virtual Golf System and Methods". application Ser. No. 15/462,628 claimed the benefit of provisional application 62/315,813, filed Mar. 31, 2016. application Ser. Nos. 15/828,255, 15/462,628, and 62/315,813 are incorporated herein by reference.

STATEMENT REGARDING FEDERALLY SPONSORED RESEARCH OR DEVELOPMENT

Not Applicable.

DESCRIPTION OF ATTACHED APPENDIX

Not Applicable.

BACKGROUND

The present invention is related to a system for playing golf and corresponding methods for playing golf.

The worldwide sport of golf is suffering. Baby boomers are aging, declining in number, and many can no longer enjoy the sport due to disabilities. Young individuals stay away because the sport is not attractive to them. They perceived the sport as too slow, too expensive, too difficult to learn, too stressful to play, elitist and too time consuming. Furthermore, the game is weather dependent. Courses stay empty because of rain, heat, and cold, and can only be played during daylight hours.

Golf courses occupy a lot of real estate and capital investment. An average a course requires 150 acres (60 hectares), of which, 50% is turf that requires intensive maintenance. Golf turf requires mowing, seeding, watering, aeration, fertilizers, pesticides etc. Adding to the capital investment are the maintenance equipment and golf cart inventories.

Worldwide, golf courses are closing at a rate of more than 150 per year, whereas only a few new courses are built. As a consequence of the factors previously described, the sport is looking for options to attract new players, to attract young players, and to keep existing players. The golf industry has reacted with new variations of the sport like 9 holes only courses, indoor golf with golf simulators, and target golf where balls are hit from central locations towards "dart board" like targets.

Current solutions only deal with some aspects of the concerns. Nine-hole golf courses still require a considerable time investment and physical abilities of the players. Golf simulators only provide a very limited golf experience as they do not allow the player to actually follow the ball after it has been hit. Other previous embodiments of putting simulators use either a modular system consisting of sections that are laid out on a fixed surface with a fixed putting hole (cup) location or use a continuous belt where the putting hole is moved to a location determined by the golf game software. Furthermore, target golf does not provide a complete game because an important part of the game, the putting, is missing.

There is an unmet need, therefore, for a configurable, flexible golf putting green system and methods which closely resemble a standard golf game played on a traditional golf putting green.

SUMMARY

The present invention relates to a flexible and configurable putting green system (Flexgreen) and corresponding methods. The various embodiments described herein may be used in combination with any type of system and golf balls or as a stand-alone practice tool. The various embodiments described herein may be used in combination with video or radar based tracking systems, golf simulators and target systems. In addition, standard regulation golf balls or proprietary golf balls designed for these systems, such as those disclosed in U.S. patent application Ser. No. 15/462,628, may be used. The combination of the Flexgreen with any of the golf drive game systems allows playing a complete game of 9 or 18 holes golf including tee off, approach, chipping, bunker shots and putting, all from one location.

Flexgreen embodiments, represented in FIGS. 1, 2, 3, and 4 of the present disclosure comprise an arrangement of modules 100, 101, 102, 103. On top of one or more of the modules is positioned a flexible artificial turf 120, mimicking the grass of a golf green. A cup 121 in the middle of the turf, riding in a slot between the modules, provides the putting hole. Multiple putting holes may be located in the turf. The position of a putting hole may be moved by rolling the artificial turf on and off two storage devices 110 and 111 located at opposite ends of the Flexgreen. The embodiments herein do not require a return of the artificial turf underneath the playing surface. The modules therefore can rest on the ground surface and can be designed with a low profile. The sides of the Flexgreen may be closed with panels covered with artificial fringe grass. The panels may be sloped. The fringe grass may slightly overlap the turf to prevent the ball from rolling off of the Flexgreen.

Before playing, a putting hole is moved to the required position by rolling and unrolling, respectively, the artificial turf from the two storage devices 110 and 111 located at opposite ends of the Flexgreen. The storage devices may include computer controlled drive units 123. The modules 100, 101, 102, 103 may be equipped with actuators which push up the artificial turf in various locations thereby providing a wide variety of turf configurations resulting in a wide variety of putting conditions. Furthermore, it can be seen that the systems described herein provide a putting surface with a highly configurable degree of difficulty.

After the Flexgreen turf 120 has moved into position, the player positions himself/herself on the Flexgreen on a putt spot 122 area that is supported by a support plate installed under the turf. Under the direction of the Flexgreen system, a player is positioned on the green to avoid transitions in the surface from the putt spot to the artificial green and putting hole. On the putt area the ball is placed on a putt spot indicated by some kind of marker, for example, a light beam in some embodiments. The Flexgreen system is equipped with sensors and safety interlocks to prevent the artificial turf from moving when a player is standing on the green.

After the player has struck the ball the system determines the position of the ball on the Flexgreen. If the ball has arrived in the putting hole, the game is complete. If not, then the system calculates the distance from the ball to the putting hole. After the player steps down from the Flexgreen the ball is returned to player by moving the Flexgreen. Next, the putting hole is moved to the next position for the next put stroke. It can be seen that moving the turf in one direction is accomplished by simultaneously unrolling turf from storage device 110 while rolling turf onto storage device 111, while moving the turf in the opposite direction is accomplished by simultaneously unrolling turf from storage device 111 while rolling turf onto storage device 110. The coordinated action required by simultaneous rolling and unrolling to achieve the desired turf motion may be coordinated by computer controlled drive units 123. This process continues until the game is complete.

If the ball ends up off of the Flexgreen or hits the fringe grass on the side panels, the system can calculate the ball position based on trajectory and speed of the ball before the ball left the Flexgreen. In this situation a calculated ball position may be used to determine how to continue the game.

BRIEF DESCRIPTION OF THE DRAWINGS

These and other features, aspects, and advantages of the present invention will become better understood with regard to the following description, appended claims, and accompanying drawings where:

FIG. 1 shows an overhead plan view of an embodiment of a configurable flexible golf putting green system according to the present disclosure.

FIG. 2 shows a side view of the system of FIG. 1.

FIG. 5A shows an overhead plan view of an embodiment of a golf putting hole according to an embodiment of the present disclosure.

FIG. 5B shows a side view of the golf putting hole of FIG. 5A.

FIG. 6A shows an overhead plan view of another embodiment of a golf putting hole according to an embodiment of the present disclosure.

FIG. 6B shows a side view of the golf putting hole of FIG. 6A.

FIG. 7 shows a side view of another embodiment of a golf putting hole according to an embodiment of the present disclosure.

LIST OF REFERENCE NUMBERS APPEARING IN THE FIGURES

Figure 3:
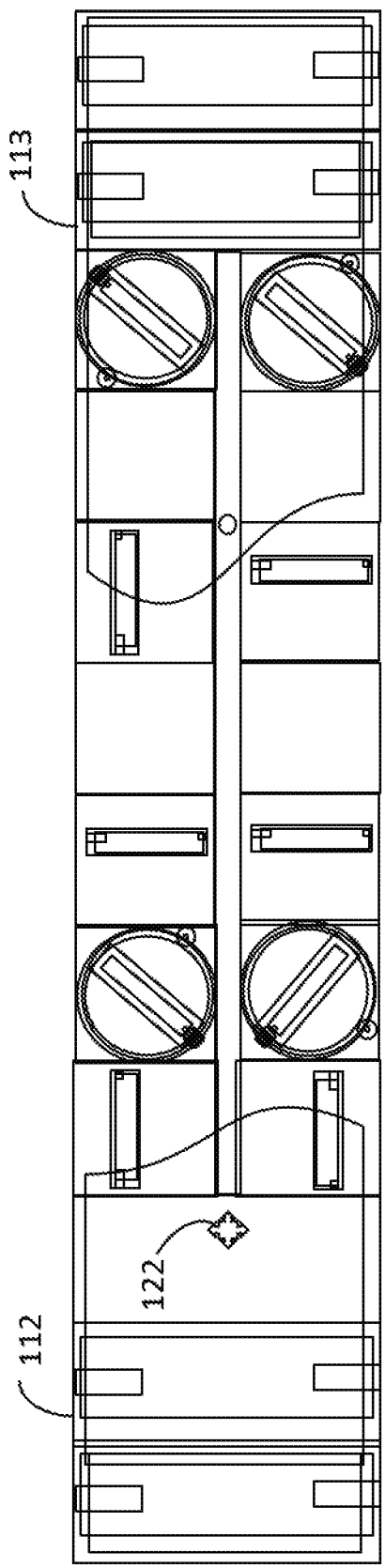
FIG. 3 shows another embodiment of a configurable flexible golf putting green system according to the present disclosure.

1—configurable flexible golf putting green
100—fixed putt location
101—fixed direction undulator module
102—rotating direction undulator module
103—flat module
110—first storage device
111—second storage device
112—first dual roll storage device
113—second dual roll storage device
120—turf belt also referred to as Turfbelt
121—golf putting hole
122—putt spot
123—computer controlled drive unit
201—support ring
203—collapsible cup
204—mounting ring
300—reinforcing material
301—stiffener rods
400—tilting actuator
401—first support plate
402—second support plate
403—artificial turf simulating fringe grass
500—opening or aperture
501—cylindrical body undulator actuator
501*a*—cylindrical body undulator actuator in a first position
501*b*—cylindrical body undulator actuator in a second position
501*c*—cylindrical body undulator actuator in a third position
502—undulator drive unit with integrated position sensors 503—supports
504—rotating module
505—drive unit
506—top plate
507—surface mounting plate
508—simple support plate
509—support plate
510—bearings
511—position sensors
512—drain
513—sprocket ring
601—undulator body
601a—undulator body in a first position
601b—undulator body in a second position
601c—undulator body in a third position
700—Fringe grass
701—tilting device
801—trackable golf ball
811—fairway terrain
812—rough terrain
813—sandy terrain
814—putting terrain
821—virtual golf system
822a, 822b, . . . —first ball locating system, second ball locating system, . . .
823—communications network
824a, 824b, . . . —first Hitspot, second Hitspot, . . .
825BPI—ball pairing interface
825D—display
825N—hitspot network
825P—processor running interactive game application
826—system location server
827—player data
828—golf course data
829—system server

DESCRIPTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

Figure 4:
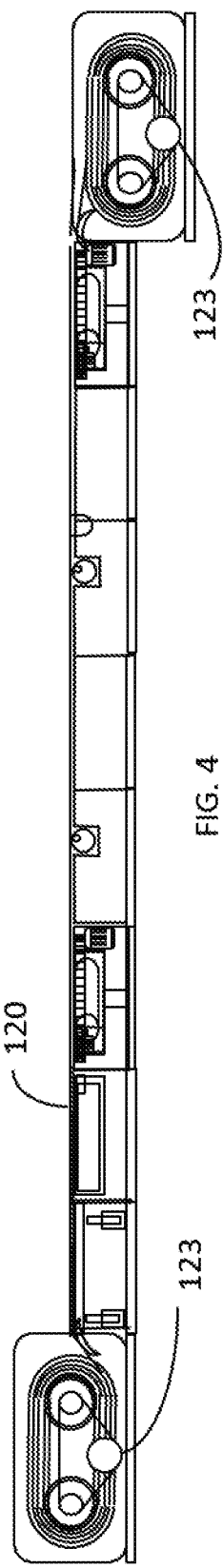
FIG. 4 shows a side view of the system of FIG. 3.

In an embodiment for a configurable flexible golf putting green system 1, shown in an over head plan view in FIG. 1 and in a side plan view in FIG. 2, the artificial turf (hereafter turf or turf belt) is arranged on a supporting structure that consists of a number of modules that can be arranged and rearranged in multiple configurations. The resulting system (hereinafter called a Flexgreen) creates a golf putting surface with a variety of controllable wavelike bends, curves and elevations (undulations) in simulation of real golf greens. Shown in overhead plan view in FIG. 3 and corresponding side plan view of FIG. 4 is another embodiment of a configurable flexible golf putting green system of the present disclosure.

A golf putting hole 121 in turf belt 120 with a cup 121 underneath that is mounted towards the middle of the turf belt provides the putting hole (hereafter putting hole, golf hole, or hole) for the game. The putting hole is moved by rolling the turf belt onto and off storage units at both ends of the Flexgreen. The embodiment of FIG. 1 and FIG. 2 shows a number of standard modules in this Flexgreen arrangement. Shown in the figures are the features: fixed putt location 100 configured to support the weight of the player who is making a putt from putt spot 122; a first fixed direction module 101 to shape the turf into an undulation in longitudinal direction (longitudinal being defined to be roughly in the direction of the putted ball); a rotating direction undulator module 102 supporting the artificial turf and shaping the turf into an undulation in a plurality directions; a second fixed direction module 101 oriented at 90 degrees to shape the turf into an undulation in transverse direction with respect to said first fixed direction module 101; a filler module 103 that provides support for the belt and extends the length of the Flexgreen configuration.

First and second fixed direction modules may be constructed with an actuator that is mounted offset from the center of the module to provide more configuration options by rotating the module 180 degrees. The modules 101, 102, 103 are configured such that in the middle of their supporting surfaces, respectively, a slot allows cup 121 to travel as the turf belt is moved forward or backward.

The modular construction also provides a means to adjust the length of the Flexgreen by inserting a variable number of modules for different applications. Each undulation module 101, 102, 103 is an integrated self-contained unit comprising: an extendable and retractable undulating mechanism to push up the artificial turf (undulator); bearings; drives and safety features. Typically all power and control wire connections use off the shelf standard connectors for quick installation and maintenance. This also allows for easily changing the configuration of the Flexgreen and promotes ease of maintenance.

Turf 120 comprises a base material in which plastic fibers are arranged to mimic golf green grass. Turf 120 may be an off the shelf product obtainable with various qualities (color, material, backing material, thickness, stiffness, speed of the golf ball on the material) as needed by the application. Alternatively a custom made belt material can be used wherein various colors can be used to aid play. In one embodiment markers may be inserted into the turf at fixed distances from the hole to aid in determining the distance of the ball from the hole. In another embodiment marketing or product logos may be inserted, woven, or printed on the surface of the material.

Turf 120 may be provided as a pre-manufactured belt (Turfbelt) with length and width and thickness determined by the configuration of the Flexgreen. In the Turfbelt one or more standard golf-hole size cups 121 are arranged similar to the way a cup is arranged in a real golf green.

Turning now to FIG. 5A and FIG. 5B, shown are an overhead plan view and side view, respectively, of a golf putting hole 121 turf 120. Golf putting hole 121 may be attached to mounting ring 204 at time of installation of the Flexgreen. Alternatively, golf putting hole may be inserted into turf 120 when the Turfbelt is manufactured. In an alternative embodiment, shown in FIG. 6A and FIG. 6B, ring 201 may be inserted in turf 120 to allow for easier putting. In another embodiment, shown in FIG. 7, golf putting hole may be constructed to be a collapsible cup 203. Collapsible cup 203 may be mounted during manufacturing of turf 120 or may be inserted into turf 120 at time of installation of the Flexgreen. Collapsible cup 203 allows the rolling up of the turf belt without removing the cup. Collapsible cup 203 may also be configured to expand when the Turfbelt is unrolled from a storage device.

Figure 8:
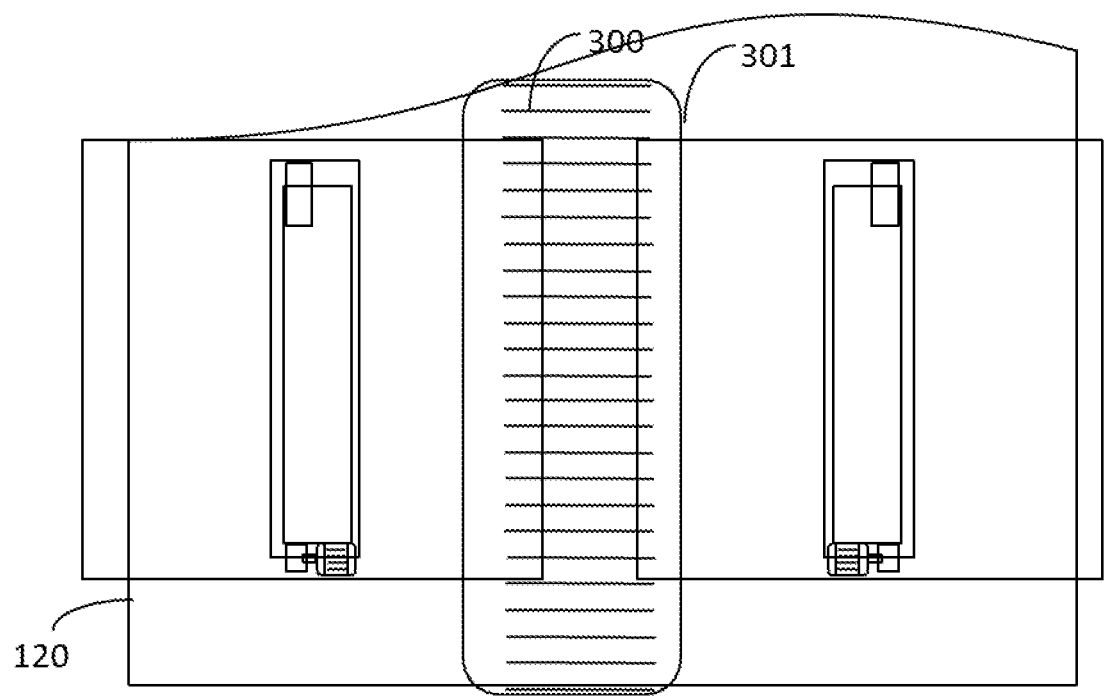
FIG. 8 shows an overhead plan view of an undulator module having an extra support means bridging across a central slot.
Figure 9:
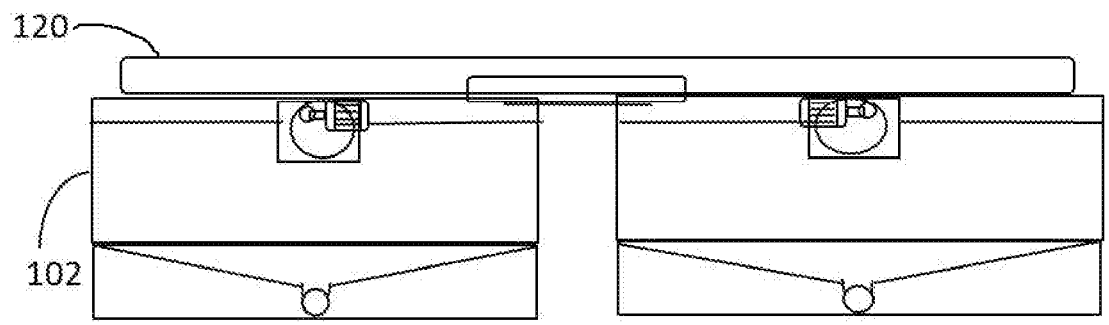
FIG. 9 shows a side view of the apparatus of FIG. 8.
Figure 10:
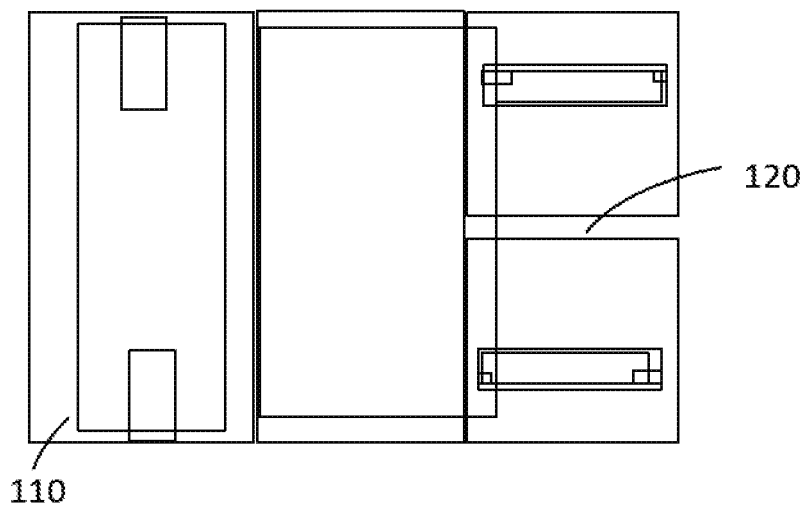
FIG. 10 shows an overhead plan view of a first storage device having a single roll configuration at one end of the Flexgreen.
Figure 11:
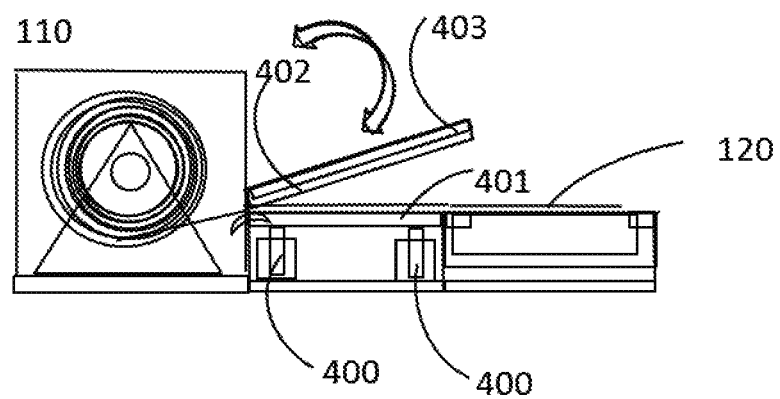
FIG. 11 shows a side view of the apparatus of FIG. 10.

FIG. 8 shows an overhead plan view of a fixed direction undulator module 101, with FIG. 9 showing a side view of the same module 101. As shown in FIG. 8, the center of the turf 120 may be reinforced with a spring-like material 300 and/or stiffener rods 301 to prevent sagging of the Turfbelt in the opening between the support surfaces where the cup travels. Reinforcements may be laminated against the back of the belt by means of adhesive tape or attached by some other durable means. Reinforcements may be metal or any suitable material arranged such that it stiffens the Turfbelt in the transverse direction while being flexible in the direction along which the Turfbelt travels.

Systems comprising a first storage device and a second storage device allow for moving the Turfbelt back and forth smoothly and in a controlled manner over the plurality of modules. The speed of the first and second storage device drive units are matched by the controller to maintain tension and thereby to avoid unwanted wrinkling of the Flexgreen Turfbelt. According to the embodiments shown in FIG. 1 through FIG. 4, and FIG. 10 through FIG. 13, at a first end of the Flexgreen, the Turfbelt is attached to a first storage device 110. The first storage device may comprise a computer or programmable logic controller (PLC) controlled drive unit operable to roll and unroll the Turfbelt. At a second end of the Flexgreen is attached a second storage device 111 with the same function as the first storage device. First and second storage devices may each be configured as a cylindrical drum that is operable to roll, unroll, and store the Turfbelt. In operation, when first storage device is fully rolled up, storage device two is unrolled, and vice-versa. This system allows moving the Turfbelt back and forth over the undulation modules. The speed of the first and second storage device drive units are matched by the controller to avoid unwanted wrinkling, bunching or stretching of the Flexgreen Turfbelt.

In other embodiments, as shown in FIG. 14 through FIG. 17, a storage device may have a two-roll configuration 112. The two roll configuration, which may be used at either end of the Flexgreen, or at both ends, has the advantage of allowing storage of the artificial turf with a lower total height enabling the overall Flexgreen to maintain a lower profile. In the two roll configuration of the storage device, a first roller and a second roller are both controlled by a computer or PLC controlled drive unit operable in a coordinated manner so that the Turfbelt may be rolled and unrolled by the coordinated action of both rollers within the storage device. The speed of both first and second rollers within the two roll configuration are matched by the controller to avoid unwanted wrinkling, bunching or stretching of the Turfbelt.

Undulations and inclinations in the Flexgreen are created by undulators that are arranged in a plurality of supporting modules. A fixed direction undulation module 101, shown in FIG. 18 through FIG. 21, may have a rectangular box shaped construction on which a top plate 506 is arranged. An extensible and retractable undulator mechanism is mounted under an opening 500 in the top plate 506 through which the undulator can be raised. The undulator mechanism comprises a moving body 501 that is rotated by a drive unit 502 around supports 503. The drive unit may comprise one or more integrated position sensors, or, one or more position sensors may be located elsewhere on the assembly to monitor the position of the moving body 501.

A rotating direction undulator module 102 shown in FIG. 22 through FIG. 25 may be implemented by mounting the undulator module in a rotating module 504 that is mounted in and flush with the surface mounting plate 507 of the rotating direction undulator module 102. The moving body 501, drive unit 502, sprocket ring 513 and supports 503 are mounted in a rotating module 504. The rotating module 504 is supported and guided by bearings 510 to provide a smooth rotational motion. The rotating undulator can be positioned in any direction relative to the motion of the Turfbelt 120 by rotating the top plate 504 with drive unit 505. Position sensors 511 provide feedback to a control unit of the position of rotating module 504 using markers on the body of rotating module 504.

Both fixed direction undulator module 101 and rotating direction undulator module 102 may be mounted on a simple support plate 508 or alternatively on a support plate 509 with integrated drain 512 for outdoor applications.

Figure 26:
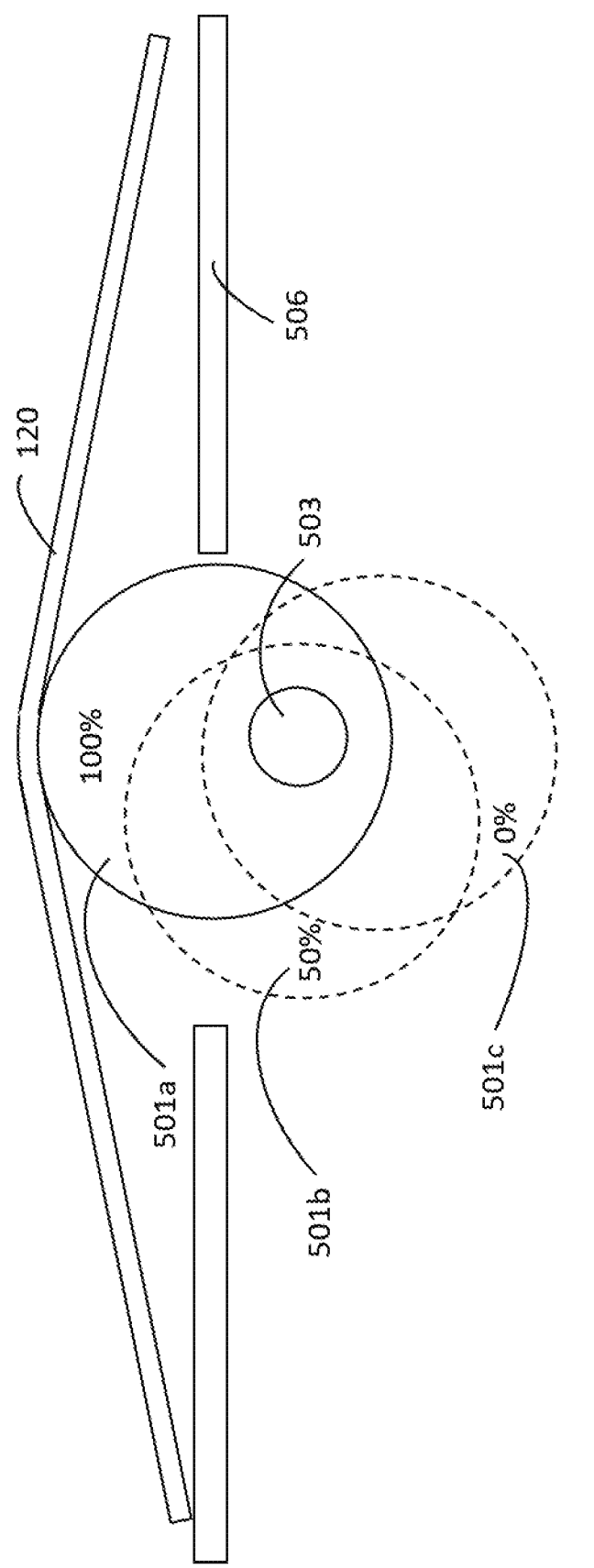
FIG. 26 shows an side plan view of an eccentrically mounted undulator body in three different positions.

Turning now to FIG. 26, shown from the side is a schematic view of an embodiment of an undulator actuator. The undulator actuator 501 is shown comprising a cylindrical body that is rotated around an eccentrically located support 503. A cam body with a non-cylindrical profile may be used instead of the cylindrical body. FIG. 26 shows three different positions of the cylindrical body in order to show differing amounts of undulation produced in the overlying turf 120. Shown at varying degrees of lift are: cylindrical body in a first position 501a shown in solid line; cylindrical body in a second position 501b shown in dotted line; and, cylindrical body in a third position 501c shown in dotted line. The shaft of the undulator may be driven by a motorized drive unit which positions the undulator actuator from a zero elevation position, which is flush with the top plate of the supporting module, to a maximum elevation the height of which is determined by the diameter of the cylindrical body and the eccentric position of support 503. The figure makes clear that any position between minimum and maximum may be repeatably produced by undulator actuator 501. When the undulator is rotated from its zero elevation position it will lift the Turfbelt 120 to a height related to the degree of elevation of the cam body or cylindrical body.

Figure 27:
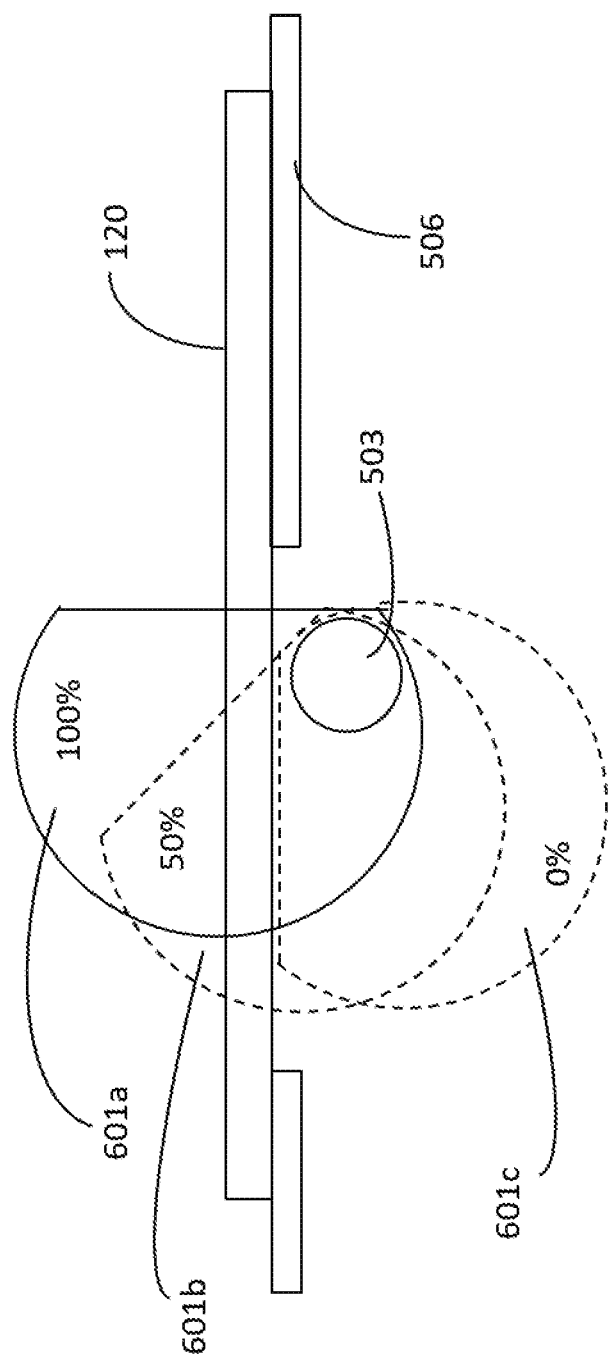
FIG. 27 shows a side plan view of another eccentrically mounted undulator body in three different positions.
Figure 28:
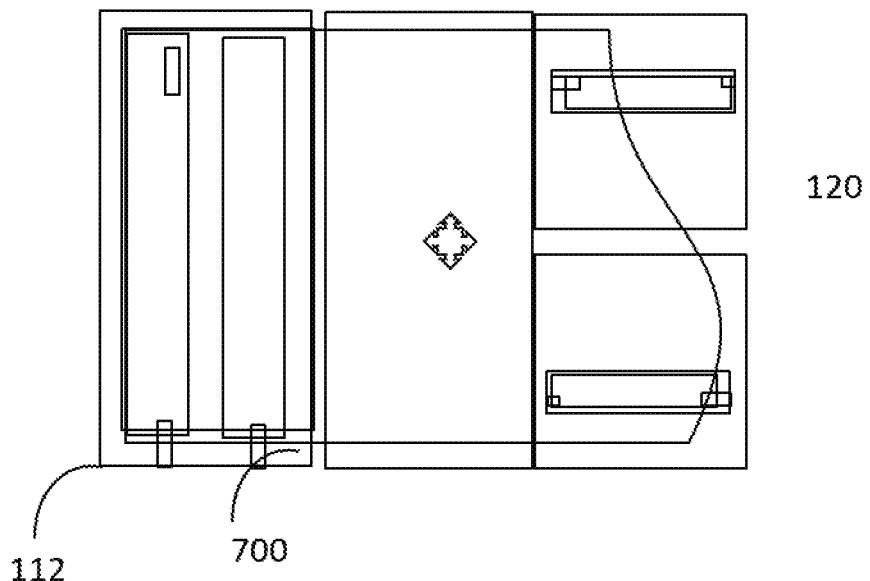
FIG. 28 shows an overhead plan view of a first storage device having a two roll configuration at one end of the Flexgreen.
Figure 29:
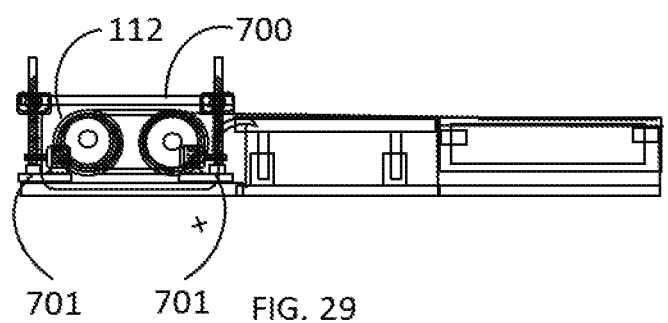
FIG. 29 shows a side view of the apparatus of FIG. 28.
Figure 30:
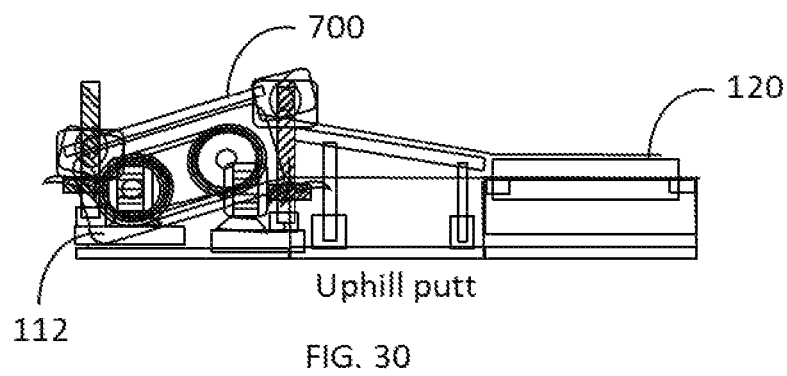
FIG. 30 shows a side view of the apparatus of FIG. 28.
Figure 31:
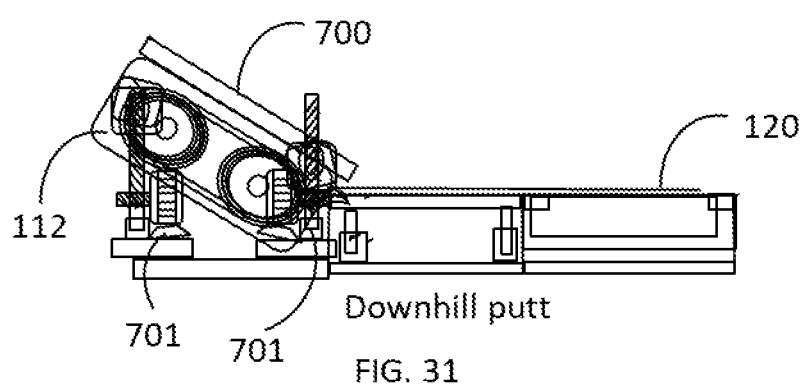
FIG. 31 shows a side view of the apparatus of FIG. 28.

Other shapes of the undulator actuator are possible, such as a cut off cylinder 601 as shown in various positions in FIG. 27, with Turfbelt 120 in the lowest position, may be used to increase the maximum undulation height or to provide more complex shapes. Shown at varying degrees of lift are: cut off cylinder in a first position 601a shown in solid line; cut off cylinder in a second position 601b shown in dotted line; and, cut off cylinder in a third position 601c shown in dotted line. Alternative embodiments of the undulator actuator are envisioned consistent with the teachings of the present disclosure. Alternatives include: a camshaft and cam followers that push up a plate on which the Turfbelt rests; a compressed air bellows: a hydraulic actuator; and others.

Depending on the installation of the supporting module under the Turfbelt, a fixed direction undulator module may be installed so that an undulator actuator is aligned parallel to the motion of the Turfbelt, or in other installations, is aligned transverse (i.e. orthogonal) to the motion of the Turfbelt. In the parallel case lifting the Turfbelt will create a longitudinal undulation in the Turfbelt. In the orthogonal case lifting the Turfbelt will create a transverse undulation or inclination in the Turfbelt.

An wide variety of undulator modules may be constructed by combining fixed and rotating actuator technologies to move various parts of the Turfbelt overlying the undulator module surface. The combination and configuration of supporting modules can create any type of undulations and inclinations over the length of the Flexgreen. The undulations/inclinations can be changed after each putt thereby adapting the surface of the Flexgreen to the new situation that developed as a result of the putt stroke. It can be seen that creating undulations configures portions of the turf belt that incline up to one or more peaks and other portions of the turf belt that decline from those same one or more peaks.

Figure 12:
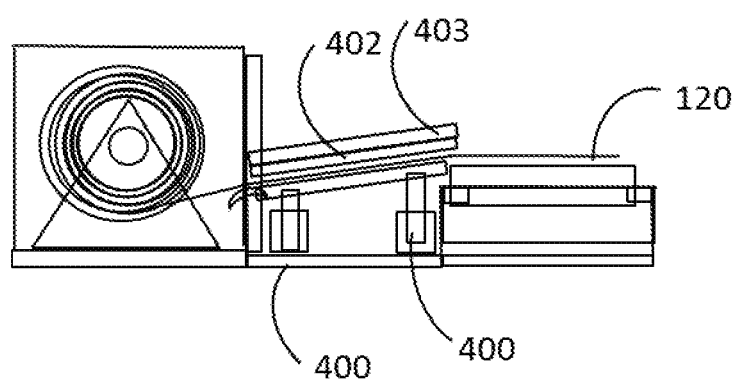
FIG. 12 shows a side view of the apparatus of FIG. 10.
Figure 13:
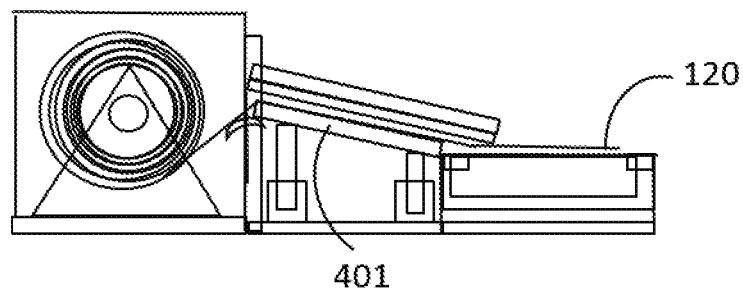
FIG. 13 shows a side view of the apparatus of FIG. 10.
Figure 14:
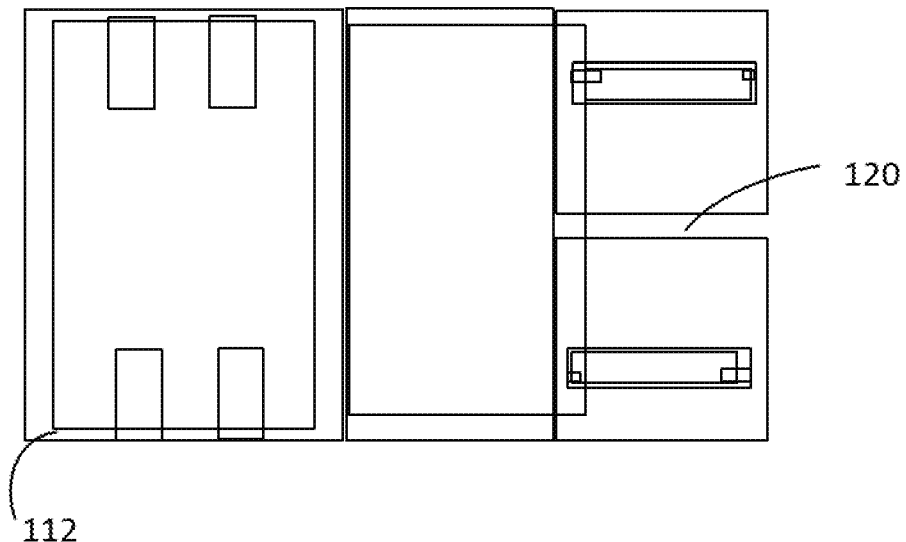
FIG. 14 shows an overhead plan view of a first storage device having a two roll configuration at one end of the Flexgreen.

At one end of the Flexgreen a fixed putt location module may be used that is designed to support the weight of the player and does not have a slot for the cup to travel. A basic embodiment of the player support plate and fixed putt location module 100 is shown in the configurations of the Flexgreen of FIG. 1 and FIG. 3. However, more sophisticated embodiments are envisioned as now described. Many golf greens have areas that have a slope. For this situation a player support module with a first support plate 401 mounted underneath the Turfbelt is envisioned that may be tilted by one or more tilt actuators 400 as shown in FIG. 12 and FIG. 13 for a single drum storage device and, in other embodiments, as shown in FIG. 16 and FIG. 17 for a dual drum storage device.

Figure 15:
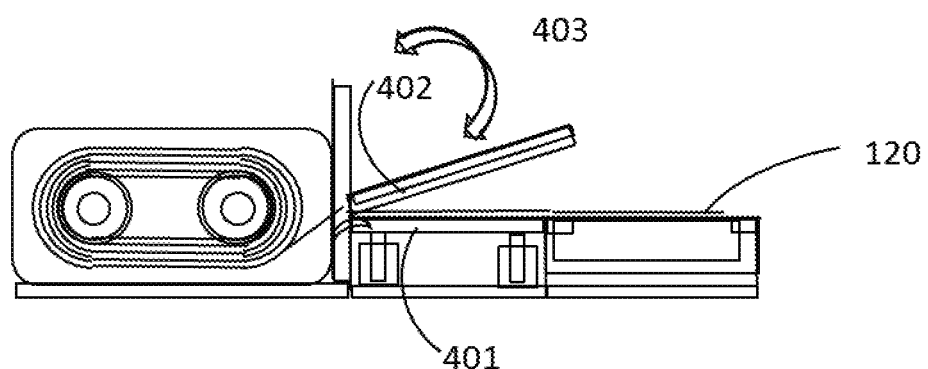
FIG. 15 shows a side view of the apparatus of FIG. 14.
Figure 16:
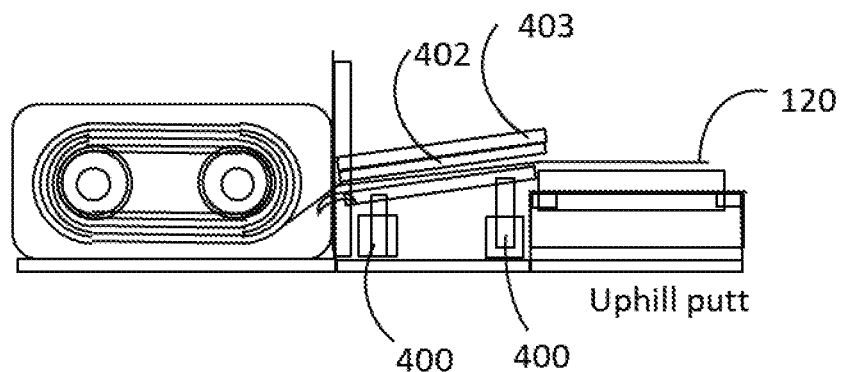
FIG. 16 shows a side view of the apparatus of FIG. 14.
Figure 17:
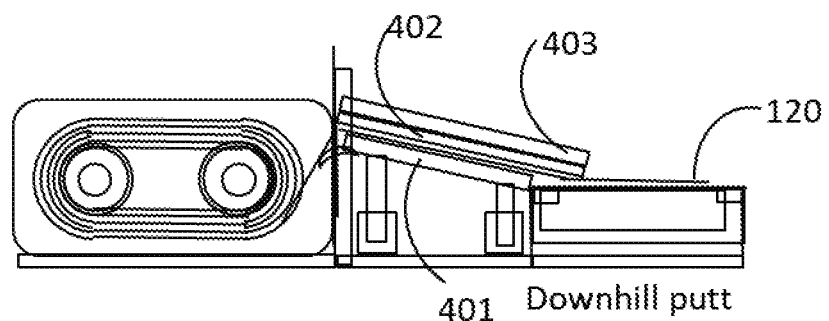
FIG. 17 shows a side view of the apparatus of FIG. 14.
Figure 18:
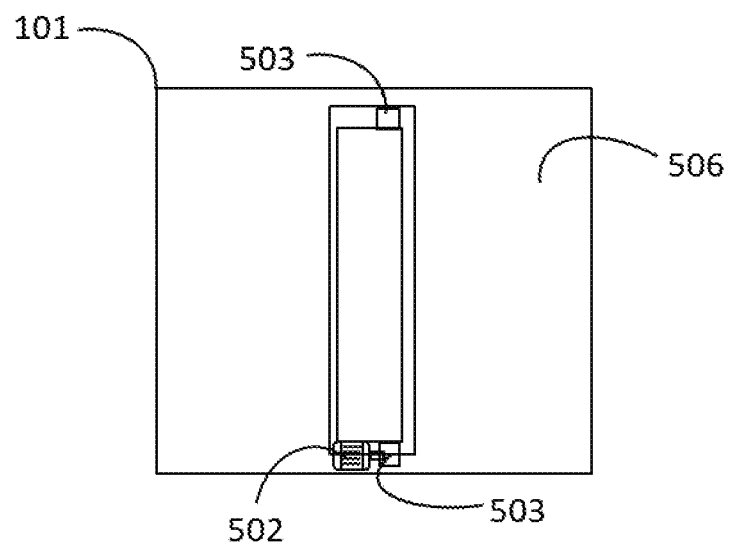
FIG. 18 shows an overhead plan view of a fixed direction undulator module.
Figure 19:
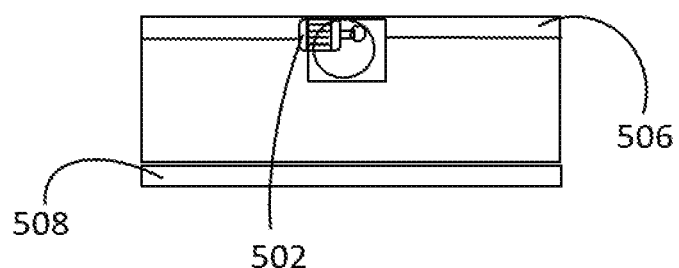
FIG. 19 shows a side view of the apparatus of FIG. 18.
Figure 20:
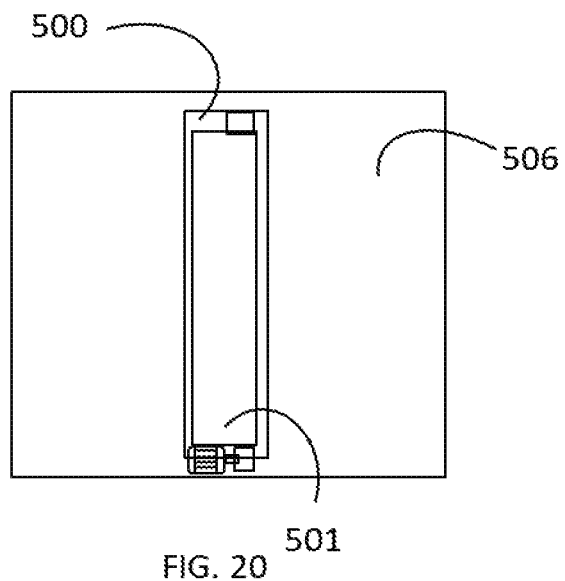
FIG. 20 shows an overhead plan view of a fixed direction undulator module.
Figure 21:
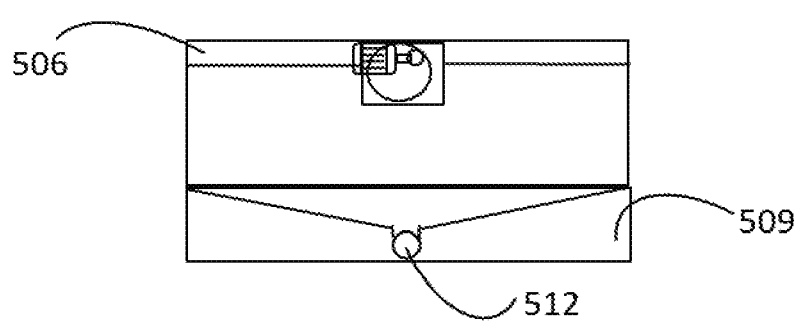
FIG. 21 shows a side view of the apparatus of FIG. 20.
Figure 22:
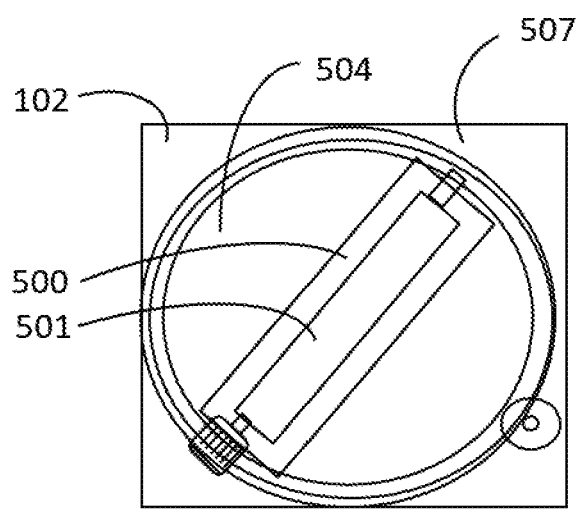
FIG. 22 shows an overhead plan view of a rotating direction undulator module.
Figure 23:
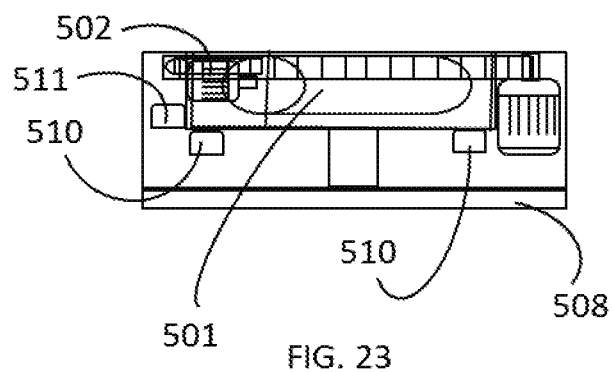
FIG. 23 shows a side view of the apparatus of FIG. 22.
Figure 24:
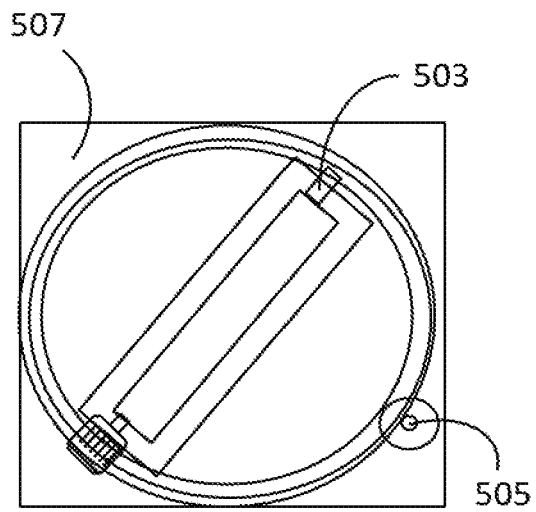
FIG. 24 shows an overhead plan view of a rotating direction undulator module.
Figure 25:
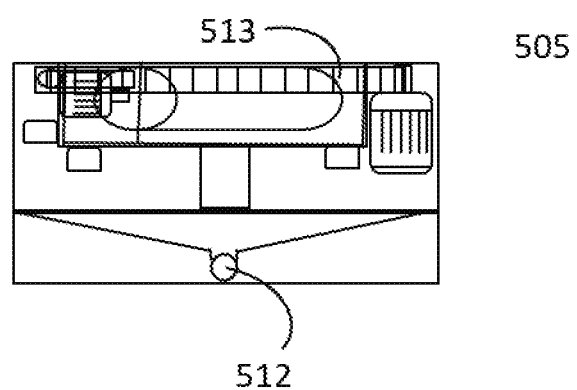
FIG. 25 shows a side view of the apparatus of FIG. 24.

With reference to FIG. 15, FIG. 16 and FIG. 17, in some embodiments the player may desire to put from the fringe grass around the golf green. For this situation optionally a second support plate 402 may be arranged such that it can be lowered on top of the Turfbelt. This plate is covered with artificial turf 403 to simulate fringe grass. This plate can be lowered either manually or automatically under computer control.

In an another embodiment, shown in FIG. 28 through FIG. 31, a fringe grass 700 may be attached to the top of the storage unit 112 at the player's end of the Flexgreen. Furthermore, this unit may be mounted on tilting devices 701 to provide the desired slope and is designed to support the weight of a player.

A plurality of modules may be assembled to provide a Flexgreen with many variations. As an example, the plurality of assembled modules shown in FIG. 1 and FIG. 2 shows, starting the description at one end of the Flexgreen: a first storage device 110; a support putt plate 100, two longitudinally oriented fixed direction undulator modules 101; two rotating direction undulator modules 102; two transversely oriented fixed direction undulator modules 101, two flat modules 103, another longitudinally oriented fixed direction undulator module 101, another transversely oriented fixed direction undulator module; two more flat modules 103; two more two rotating direction undulator modules 102; and a second storage device 111. The cup travels longitudinally along the space between the modules. In another embodiment shown in FIG. 3 and FIG. 4, a similar configuration of a plurality of undulations modules is shown having using dual roll storage units 112 and 113 at opposite the ends of the Turfbelt.

With continuing reference to FIG. 1 through FIG. 4, depending on the direction of the Turfbelt's movement, the cup moves either toward the putt spot 122 or away. Once the desired distance between the putt spot and the cup is realized the Turfbelt stops. Safety interlocks may be provided so that the Turfbelt can only be moved when nobody is present on the Turfbelt. When the Turfbelt has stopped the software may move several undulators in order to provide the required undulation and inclination for that putt. Once the undulator positions are set, one of the two storage unit's drives are powered to tension the Turfbelt such that the Turfbelt has a smooth gradual undulations. After setting the desired undulations and setting the desired tension in the Turfbelt, the player may step on the supporting putt plate to put the ball on the putt spot and play.

After the player has struck the ball, the location of the ball is determined by the system. One preferred embodiment is a single camera arranged such that it can view the entire system. Vision software in the camera system determines the location of the ball and forwards that information to the game control software of the system. In other embodiments, the ball location and tracking system as described in patent application Ser. No. 15/462,628 may be used to determine the location of the ball.

A game control software operating in a golf computer as part of a computerized control system may then determine the next action, instruct the player using the game display, and reposition the Turfbelt and actuators according to the game's instructions. Multiple cameras may be needed in certain configurations where lighting conditions are such that they are beyond the capabilities of a single camera, for instance when the player's part of the Flexgreen is installed in a covered area to protect the players from weather and the rest is outdoors in full sunshine.

To facilitate the installation of the Flexgreen on an existing golf driving range, the top of the back storage module can be set at the same height as the rest of the Flexgreen by partly recessing a portion of the first storage device or the second storage device, or both, below ground level. To accommodate use in wet conditions provisions for water drainage may be installed in one or more of the storage devices.

In case of harsh weather conditions like: heat; freezing cold; snow; and, frozen slurry conditions; the modules may be covered with transparent housing through which warm and/or cold air can be blown from an air heating and/or cooling unit. Thus, the modules and Turfbelt may thereby be protected from freezing and snow will melt so that even in these conditions the ball stays visible for the player and cameras so that even in those conditions the golf game can be played.

Figure 32:
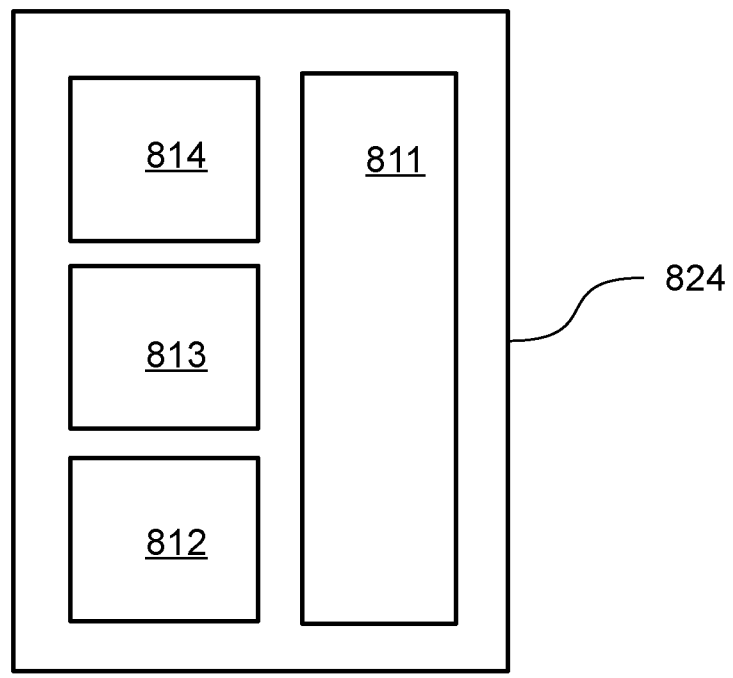
FIG. 32 shows an embodiment of a virtual golf system that may integrate into its operation the various embodiments of configurable flexible golf putting green system of the present disclosure.

Turning now to FIG. 32, shown is an embodiment of a virtual golf system that may integrate into its operation the various embodiments of configurable flexible golf putting green system and methods previously described. FIG. 32 shows an overhead plan view of a hitspot 824 comprising multiple regions of varied terrain: fairway terrain 811; rough terrain 812; sandy terrain 813; putting terrain 814. Golf strokes can be played from each of the terrain regions. It can be understood that the term playing a golf stroke means striking a golf ball with a golf club, as is conventional activity in the game of golf. Hitspot 824 is the location from where all the balls are played and may consist of multiple terrain regions from which balls can be hit towards an area suitable for that purpose such as a golf driving range. Fairway terrain 811 may be made with artificial or real grass as is common on a fairway of a conventional golf course. Rough terrain region 812 may be made with artificial or real grass as is common adjacent to the fairway grass area on a conventional golf course. Sandy terrain 813 may be configured to simulate commonly encountered bunkers and/or sand traps on a conventional golf course. This arrangement of varied terrains comprising hitspot 824 creates the possibility of practicing all golf strokes from the hitbox that are commonly used on a conventional golf course. Configurable flexible golf putting green systems of the present disclosure may provide the putting terrain 814 of a virtual golf system thereby providing a wide variety of putting configurations.

A typical game is conducted by playing a combination of driving and approach shots from the hitspot. Each shot that a player takes results in an update to the position of the ball on a virtual golf course. Eventually, the player's ball will be played onto the virtual green. The virtual golf system keeps track of the distance between the ball and the virtual golf hole, updating that distance with each shot the player takes. When the ball has reached the virtual green the virtual golf system is effective for positioning the turf belt to create a desired position of the golf hole. The virtual golf system is also effective for positioning various actuators and undulators so as to create undulation and inclination of the flex green according to the location of the ball on the virtual green. The terrain of the virtual golf hole may thereby be recreated on the flex green. Once the turf belt is positioned and the actuators and undulators have been set, the player may continue playing the hole by putting. In this way a complete 9 or 18 hole game can be played including actual putting.

Figure 33:
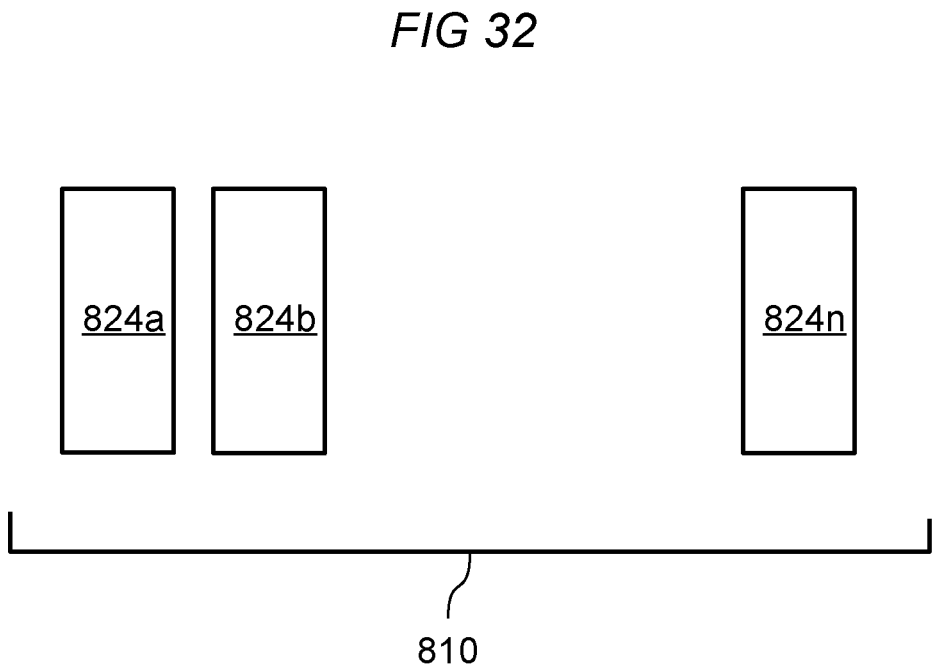
FIG. 33 shows a shows a schematic representation of a portion of a driving range or golf facility comprising a plurality of hitspots.

FIG. 33 shows a schematic representation of a portion 810 of a driving range or golf facility comprising a plurality of hitspots 824a, 824b, . . . , 824n. Multiple players can be active simultaneously on more than one of the plurality of hitspots. In addition, hitspots may be embodied in a static configuration or a flexible configuration. In the flexible configuration of a hitspot, the terrain regions may be constructed in such a way that they can be placed mechanically under an inclination simulating the inclination of certain areas in a conventional golf course. The degree of inclination as well as the direction of inclination can be set under the control of a system controller. Also under the control of a system controller, the turf belt of a Flexgreen may be moved to any desired position to facilitate various strokes of the putting phase of the golf game. Furthermore, the undulator mechanisms of the Flexgreen putting terrain module 814 may be controlled by the system controller to take on a wide variety of undulations, inclinations, and declinations.

Figure 34:
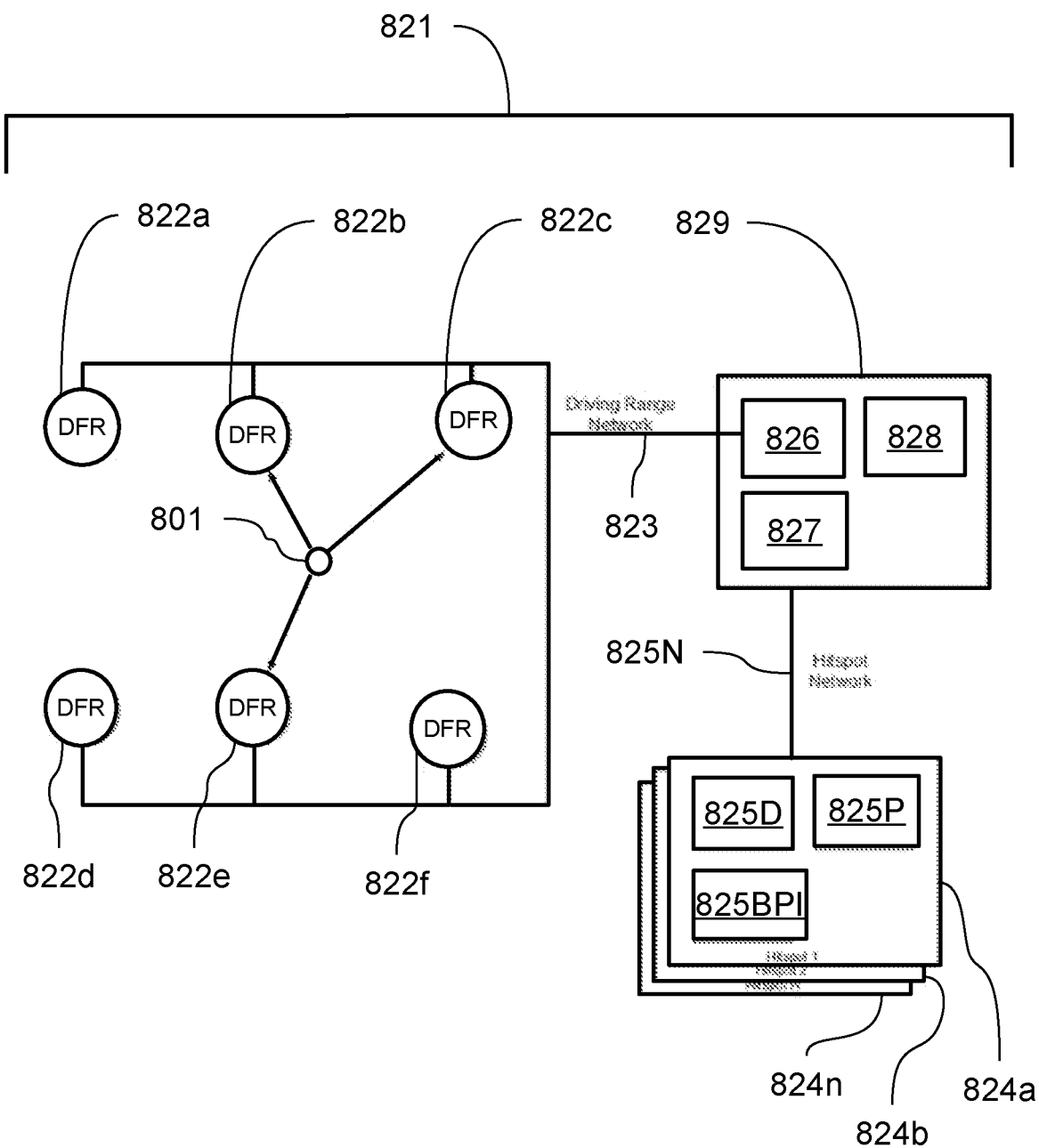
FIG. 34 shows a schematic view of an embodiment of a virtual golf system for playing golf.

Turning now to FIG. 34, shown is a schematic view of an embodiment of a virtual golf system 821 for playing golf in accordance with the present disclosure. A plurality of ball locating systems 822a, 822b, 822c, 822d, 822e and 822f may be placed around the golf facility. One or more hitspots 824a, 824b, . . . , 824n are disposed within the operational area of the plurality of ball locating systems 822a, 822b, . . . , 822f. Trackable golf ball 801 is shown within the operational area of the virtual golf system. The exact location of the each of the plurality of ball locating systems in relation to the golf facility is recorded in system location server 826. In some embodiments, the ball locating systems may each use one or more cameras to determine the location of a golf ball within the playable area. Each ball locating system may then update a system location server 826 with ball location information for use in maintaining the virtual golf game.

System location server 826 may use information received over communication network 823 from the plurality of ball locating systems 822a, 822b, . . . to calculate the position of trackable golf ball 801 on any of the playable terrain types, including embodiments of the configurable flexible gold putting green.

Each hitspot 824a, 824b, . . . , 824n comprises: a display 825D for displaying information to one or more players using that hitspot; a processor 825P operable for running an interactive game application and a user interface; a ball paring interface 825BPI; and a bidirectional networked connection to a hitspot network 825N which transmits and receives data to and from system server 829.

Operation of the system according to FIG. 34 may proceed as follows. Before every stroke, the player who is about to strike the ball identifies himself/herself by selecting from a menu on the monitor at the Hitspot. The turf belt may then be advanced in either a forward or reverse direction and the undulators set to varying degrees of undulation thereby providing a putting experience according to the simulated green condition for that player.

A plurality of ball locating systems 822a, 822b, . . . , 822f may be set up on the golf facility to receive the data from the wirelessly trackable golf ball 801. Ball locating systems are networked and send the direction data and the received ball data to a server that, based on the data from several ball locating systems, computes the location of the golf ball on the golf facility.

System server 829 comprises a location server 826 that maintains a database of golf balls (identity) and their association with the Hitspot, player, game (golf course) and sends the location and identity information to the golf game application that has been paired with the golf ball. The golf game application may be running on the game controller 825P on the computer at the Hitspot or on another computer on the network. System server also comprises golf course data 828 and player data 827 for use during the game. In communication with the system server is a golf computer that has access to a database comprising geographic features of a plurality of simulated golf greens comprise elevation, inclination and distance data effective for setting the positions of a plurality of undulators under the turf belt and the distance of a golf hole from the putt spot.

After each golf stroke, location information for the resulting position of a putted golf ball may be sent to the location server. The location server can detect each hit of the ball and report that information to the game controller. The game controller may then move the turfbelt to position the golf cup for the next stroke and change the position of one or more undulators, thereby allowing the simulation of a great variety of putting terrains and situations. When a putted ball drops in the golf cup the system may further detect that the ball has been sunk. Alternatively, a detector in the hole can signal the presence of a ball.

Aspects of the operational flowchart and associated methods are now described. The system software consists of several applications and databases. Typically a hitspot processor and hitspot display at the driving location will implement the processes required to interact with the players at that location. The location server application maintains ball information data for each of the players on the driving range and correlates ball position data with the proper player application processes. The location server and ball information (Ball in Play) will be located on central system server in the system.

A database maintains membership status and golf results and unfinished game(s) by player. The membership status affects which type of game and what global interaction can be played. It could for instance be used to elevate the player status to a higher level depending on his activity level and results.

One or more of the following records may be kept in a player information database: membership status; handicap; statistics; games played; golf course; script; strokes (club, distance, ball id, weather conditions); game id; can be shared by multiple players and if shared the id will be identifiable as multiple player/tournament id.

One or more of the following records may be kept in a games database: database of available golf courses, either actual or fictitious, and scripts for the games to be played (various rules and scoring scripts, tournaments); golf courses; game & tournament scripts.

Operational software may be structured in various modules such that the system can be distributed over a number of physically separate computers as needed. A module for game user interface may contain: graphical front end for the game server module; user menus and inputs; graphical representation of the current game status; view of the golf course, looks up golf course data to calculate view; game scores and statistics; and ball pairing input, collects data of the ball presented to the ball pairing interface and pairs the data with the current active player. Sends the ball data to game server.

The game application module may comprise the following functionalities: one instance per player, set up such that it can interact with remote players; interacts with player database to collect status from other players and games database to compute game status; player login; game setup; available choices dependent on membership status of player; multiple player set up for games with multiple players; other players to log in have to look up that game in a list of current multiple player games for the same or remote locations; alternatively multiple player games can be set up at the club house desk or a tournament organizer; matching, equal level partners can be selected via "dating" sites with possibility to chat, for instance using a Facebook Application or other social media; set up record in player information database; record status information (strokes and ball position per player); sends ball pairing data to ball-in-play database; get data from ball location server; compute game status and send it to game user interface; update player information database with stroke data.

A location server module may comprise the following functionalities: get messages from the ball locating systems and calculate ball position; maintains ball-in-play database; look up ball in ball-in-play database; create message with ball data (id, position and status information) and send it to the game server.

Any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

The invention claimed is:

1. A configurable flexible golf putting green system, the system comprising:
   a) a turf belt tensioned between a first storage device and a second storage device, said turf belt comprising a simulated putting green surface adhered to a flexible substrate, said turf belt not configured into a continuous loop;
   b) at least one golf putting hole disposed in said turf belt;
   c) said turf belt overlying a plurality of undulator modules, further characterized in that a portion of the turf belt is in contact with each of said plurality of undulator modules, the turf belt further comprising:
      i) a stored portion that is stored in at least one of said first storage device or said second storage device;
      ii) a playable portion overlying said plurality of undulator modules;
   d) at least one of said plurality of undulator modules comprising:
      i) a planar support plate configured to allow said flexible substrate to move across it, the support plate having an aperture;
      ii) an undulator actuator configured to raise and lower an undulator body through said aperture, wherein raising said undulator body lifts a portion of the turf belt above said planar support plate;
   e) said first and second storage devices operable under a control system to move said turf belt in both a forward direction and a backward direction, said forward direction characterized in that the playable portion of the turf belt moves in the direction from said first storage device toward said second storage device, said backward direction characterized in that the playable portion of the turf belt moves in the direction from said second storage device toward said first storage device;
   f) said first storage device operable to store a portion of said turf belt when said turf belt is moved in said backward direction;
   g) said second storage device operable to store a portion of said turf belt when said turf belt is moved in said backward direction;
   h) a putt spot comprising a portion of said turf belt and a support structure underneath said turf belt configured to support the weight of one or more players about said putt spot.

2. The system of claim 1 further characterized in that at least one of the plurality of undulator modules has an elongated undulator body coupled to a drive unit, said drive unit operable to create a variable rotation of said undulator body, said variable rotation operable to raise and lower a portion of the turf belt above said planar support plate.

3. The system of claim 1 further characterized in that at least one of the plurality of undulator modules is a rotating direction undulation module comprising: a rotation drive coupled to an elongated undulator body and operable to rotate said elongated undulator body in a plurality of directions parallel to said planar support plate.

4. The system of claim 1 further characterized in that at least one of the first or second storage devices comprises an elongated rotating element on which the turf belt is rolled onto and from which the turf belt is unrolled from under the control of a computer controlled drive unit.

5. The system of claim 4 further characterized in that both the first and second storage devices each comprise an elongated rotating element on which the turf belt is rolled-up and from which the turf belt is unrolled-from, both said rolling-up and said unrolling-from under the control of a computer controlled drive unit, said computer controlled drive unit operable to move said turf belt in said forward direction and in said backward direction without creating a un-tensioned portion in said playable portion of said turf belt.

6. The system of claim 1 further characterized in that at least one of the first or second storage devices comprises two elongated rotating elements on which the turf belt is rolled onto and from which the turf belt is unrolled from under the control of a computer controlled drive unit.

7. The system of claim 6 further characterized in that both the first and second storage devices each comprise two elongated rotating elements on which the turf belt is rolled onto and from which the turf belt is unrolled from, both said rolling-up and said unrolling-from under the control of a computer controlled drive unit, said computer controlled drive unit operable to move said turf belt in said forward direction and in said backward direction without creating a un-tensioned portion in said playable portion of said turf belt.

8. The system of claim 1 further comprising a golf computer operable to control the position of said turf belt thereby disposing said golf putting hole at a desired distance from said putt spot, the position of said golf putting hole determined by a player's simulated position on a virtual golf course.

9. The system of claim 1 further comprising a golf computer operable to control the position of each of said plurality of undulators modules thereby creating a desired shape of said simulated putting green surface, the shape determined by a player's simulated position on a virtual golf course.

10. The system of claim 8 further characterized in that the golf computer is operable to control the turf belt to return a putted ball to a player by moving said turf belt toward the putt spot, and then control the position of said turf belt thereby disposing said golf putting hole at a desired distance from said putt spot, the position of said golf putting hole determined by a player's simulated position on a virtual golf course.

11. A method of providing a configurable flexible golf putting green system, the system comprising: a turf belt that comprises a simulated putting green surface adhered to a flexible substrate, the turf belt not being configured into a continuous loop; a first storage device; a second storage device; a plurality of undulator modules; and, a control system operable to move the turf belt in a forward direction and a backward direction, the method comprising the steps of:
   a) tensioning said turf belt between said first storage device and said second storage device, the turf belt further comprising:
      i) a stored portion that is stored in at least one of said first storage device or said second storage device;
      ii) a playable portion overlying said plurality of undulator modules;
   b) disposing at least one golf putting hole in said turf belt;
   c) disposing the plurality of undulator modules under said turf belt, further characterized in that a portion of the turf belt is in contact with each of said plurality of undulator modules, at least one of said plurality of undulator modules comprising a planar support plate having an aperture, the method further comprising:
      i) configuring said planar support plate to allow said flexible substrate to move across it;
      ii) configuring an undulator actuator to raise and lower an undulator body through said aperture, wherein raising said undulator body lifts a portion of the turf belt above said planar support plate;
   d) configuring said control system to control said first and second storage devices to move said turf belt in both said forward direction and said backward direction, said forward direction characterized in that the playable portion of the turf belt moves in the direction from said first storage device toward said second storage device, said backward direction characterized in that the playable portion of the turf belt moves in the direction from said second storage device toward said first storage device;
   e) storing a portion of said turf belt in said first storage device when said turf belt is moved in said backward direction;
   f) storing a portion of said turf belt in said second storage device when said turf belt is moved in said forward direction;
   g) configuring a portion of said turf belt to be a putt spot by configuring a support structure underneath said putt spot to support the weight of one or more players about said putt spot.

12. The method of claim 11, the step of disposing a plurality of undulator modules under said turf belt further characterized in that at least one of the plurality of undulator modules comprises an elongated undulator body coupled to a drive unit operable to create a variable rotation of said undulator body, the method further comprising the step of creating a said variable rotation to raise and lower a portion of the turf belt above said planar support plate.

13. The method of claim 11, the step of disposing a plurality of undulator modules under said turf belt further characterized in that at least one of the plurality of undulator modules is a rotating direction undulation module comprising: a rotation drive coupled to an elongated undulator body, the method further comprising the step of rotating said elongated undulator body in a plurality of directions parallel to said planar support plate.

14. The method of claim 11 further comprising the step of coupling to the first or second storage devices an elongated rotating element on which the turf belt is rolled onto and from which the turf belt is unrolled from under the control of a computer controlled drive unit.

15. The method of claim 14 further comprising the step of coupling to both the first and second storage devices an elongated rotating element on which the turf belt is rolled-up and from which the turf belt is unrolled-from, both said rolling-up and said unrolling-from under the control of a computer controlled drive unit, said computer controlled drive unit operating to move said turf belt in said forward direction and in said backward direction without creating a un-tensioned portion in said playable portion of said turf belt.

16. The method of claim 11 further comprising the step of coupling to at least one of the first or second storage devices two elongated rotating elements on which the turf belt is rolled onto and from which the turf belt is unrolled from under the control of a computer controlled drive unit.

17. The method of claim 16 further comprising the step of coupling to both the first and second storage devices two elongated rotating elements on which the turf belt is rolled onto and from which the turf belt is unrolled from, both said rolling-up and said unrolling-from under the control of a computer controlled drive unit, said computer controlled drive unit operating to move said turf belt in said forward direction and in said backward direction without creating a un-tensioned portion in said playable portion of said turf belt.

18. The method of claim 11 further comprising the step of controlling the position of said turf belt with a golf computer to dispose said golf putting hole at a desired distance from said putt spot, the position of said golf putting hole determined by a player's simulated position on a virtual golf course.

19. The method of claim 11 further comprising the step of controlling the position of each of said plurality of undulators modules with a golf computer thereby creating a desired shape of said simulated putting green surface, the shape determined by a player's simulated position on a virtual golf course.

20. The method of claim 18 further comprising the step of controlling the turf belt to return a putted ball to a player by moving said turf belt toward the putt spot, and then controlling the position of said turf belt thereby disposing said golf putting hole at a desired distance from said putt spot, the position of said golf putting hole determined by a player's simulated position on a virtual golf course.

* * * * *